US008892938B1

(12) United States Patent
Sundaram et al.

(10) Patent No.: US 8,892,938 B1
(45) Date of Patent: Nov. 18, 2014

(54) CLUSTERED RAID ASSIMILATION MANAGEMENT

(71) Applicant: NetApp, Inc., Sunnyvale, CA (US)

(72) Inventors: Rajesh Sundaram, Mountain View, CA (US); Bharat Baddepudi, San Jose, CA (US)

(73) Assignee: NetApp, Inc., Sunnyvale, CA (US)

( * ) Notice: Subject to any disclaimer, the term of this patent is extended or adjusted under 35 U.S.C. 154(b) by 0 days.

(21) Appl. No.: 14/161,281

(22) Filed: Jan. 22, 2014

Related U.S. Application Data

(63) Continuation of application No. 14/149,488, filed on Jan. 7, 2014.

(51) Int. Cl.
*G06F 11/00* (2006.01)
*G06F 11/20* (2006.01)

(52) U.S. Cl.
CPC ........ *G06F 11/2069* (2013.01); *G06F 11/2053* (2013.01)
USPC .......................... 714/6.21; 714/6.3; 707/650

(58) Field of Classification Search
None
See application file for complete search history.

(56) References Cited

U.S. PATENT DOCUMENTS

| | | | |
|---|---|---|---|
| 5,459,857 A * | 10/1995 | Ludlam et al. ............... | 714/6.12 |
| 5,937,425 A | 8/1999 | Ban | |
| 6,578,158 B1 * | 6/2003 | Deitz et al. ..................... | 714/11 |
| 7,047,358 B2 * | 5/2006 | Lee et al. ...................... | 711/114 |
| 7,249,150 B1 | 7/2007 | Watanabe et al. | |
| 7,603,529 B1 * | 10/2009 | MacHardy et al. ............ | 711/162 |
| 7,680,837 B2 | 3/2010 | Yamato | |
| 7,831,769 B1 * | 11/2010 | Wen et al. ...................... | 711/114 |
| 7,996,636 B1 | 8/2011 | Prakash et al. | |
| 8,082,390 B1 | 12/2011 | Fan et al. | |
| 8,099,396 B1 | 1/2012 | Novick et al. | |
| 8,205,065 B2 | 6/2012 | Matze | |
| 8,341,457 B2 | 12/2012 | Spry et al. | |
| 8,417,987 B1 | 4/2013 | Goel et al. | |
| 8,495,417 B2 | 7/2013 | Jernigan, IV et al. | |
| 8,539,008 B2 | 9/2013 | Faith et al. | |
| 8,560,879 B1 | 10/2013 | Goel | |
| 8,595,434 B2 * | 11/2013 | Northcutt et al. ............. | 711/114 |
| 8,595,595 B1 | 11/2013 | Grcanac et al. | |
| 2002/0073354 A1 * | 6/2002 | Schroiff et al. ................... | 714/4 |
| 2002/0188711 A1 * | 12/2002 | Meyer et al. .................. | 709/223 |

(Continued)

OTHER PUBLICATIONS

Lamport, Leslie, "The Part-Time Parliament," ACM Transactions on Computer Systems, vol. 16, No. 2, May 1998, pp. 133-169.

(Continued)

*Primary Examiner* — Gabriel Chu
(74) *Attorney, Agent, or Firm* — Cesari and McKenna, LLP

(57) ABSTRACT

In one embodiment, RAID-related metadata may be stored on a distributed database of a cluster (i.e., a cluster database), which is separate and apart from a storage array of SSDs configured to serve as main storage for nodes of the cluster. The RAID-related metadata may be embodied as RAID labels (or other data structures) having configuration information that identifies one or more RAID groups associated with an extent store and storage devices, e.g., SSDs, within each RAID group. Each SSD may be part of a RAID configuration topology tree structure that defines an extent store using a multi-level hierarchy (e.g., three levels), wherein the first level of the tree identifies the SSD, the second level identifies the RAID group to which the SSD belongs, and the third level identifies the extent store or storage container to which the RAID group belongs.

20 Claims, 11 Drawing Sheets

(56) References Cited

U.S. PATENT DOCUMENTS

| | | |
|---|---|---|
| 2003/0120869 A1 | 6/2003 | Lee et al. |
| 2005/0144514 A1 | 6/2005 | Ulrich et al. |
| 2005/0177770 A1* | 8/2005 | Coatney et al. ............... 714/15 |
| 2007/0143359 A1 | 6/2007 | Uppala |
| 2007/0234106 A1* | 10/2007 | Lecrone et al. ............... 714/6 |
| 2010/0042790 A1 | 2/2010 | Mondal et al. |
| 2010/0088296 A1 | 4/2010 | Periyagaram et al. |
| 2011/0035548 A1 | 2/2011 | Kimmel et al. |
| 2011/0213928 A1 | 9/2011 | Grube et al. |
| 2012/0016840 A1* | 1/2012 | Lin et al. ............... 707/626 |
| 2012/0290788 A1 | 11/2012 | Klemm et al. |
| 2013/0018854 A1 | 1/2013 | Condict |
| 2013/0138862 A1 | 5/2013 | Motwani et al. |
| 2013/0238832 A1 | 9/2013 | Dronamraju et al. |
| 2013/0238932 A1 | 9/2013 | Resch |
| 2013/0268497 A1 | 10/2013 | Baldwin et al. |
| 2013/0346810 A1 | 12/2013 | Kimmel et al. |
| 2014/0068184 A1* | 3/2014 | Edwards et al. ............... 711/114 |

OTHER PUBLICATIONS

Cornwall, Michael, "Anatomy of a Solid-state Drive," ACM Queue—Networks, vol. 10, No. 10, Oct. 2012, pp. 1-7.

"Cuckoo hashing," Wikipedia, http://en.wikipedia.org/wiki/Cuckoo_hash, Apr. 2013, pp. 1-5.

Culik, K., et al., "Dense Multiway Trees," ACM Transactions on Database Systems, vol. 6, Issue 3, Sep. 1981, pp. 486-512.

Debnath, Biplob, et al., "FlashStore:.High Throughput Persistent Key-Value Store," Proceedings of the VLDB Endowment VLDB Endowment, vol. 3, Issue 1-2, Sep. 2010, pp. 1414-1425.

Gal, Eran et al., "Algorithms and Data Structures for Flash Memories," ACM Computing Surveys, vol. 37, No. 2, Jun. 2005, pp. 138-163.

Gray, Jim et al., "Flash Disk Opportunity for Server Applications," Queue—Enterprise Flash Storage, vol. 6, Issue 4, Jul.-Aug. 2008, pp. 18-23.

Handy, Jim, "SSSI Tech Notes: How Controllers Maximize SSD Life," SNIA, Jan. 2013, pp. 1-20.

Leventhal, Adam H. "A File System All Its Own," Communications of the ACM Queue, vol. 56, No. 5, May 2013, pp. 64-67.

Lim, H. et al., "SILT: A Memory-Efficient, High-Performance Key-Value Store," Proceedings of the $23^{rd}$ ACM Symposium on Operating Systems Principles (SOSP'11), Oct. 23-26, 2011, pp. 1-13.

Moshayedi, Mark, et al., "Enterprise SSDs," ACM Queue—Enterprise Flash Storage, vol. 6 No. 4, Jul.-Aug. 2008, pp. 32-39.

Pagh, Rasmus, et al., "Cuckoo Hashing," Elsevier Science, Dec. 8, 2003, pp. 1-27.

Pagh, Rasmus, "Cuckoo Hashing for Undergraduates," IT University of Copenhagen, Mar. 27, 2006, pp. 1-6.

Rosenblum, Mendel, et al., "The Design and Implementation of a Log-Structured File System," Proceedings of the $13^{th}$ ACM Symposium on Operating Systems Principles, Jul. 24, 1991, pp. 1-15.

Rosenblum, Mendel, et al., "The LFS Storage Manager," Summer '90 USENIX Technical Conference, Anaheim, California, Jun. 1990, pp. 1-16.

Rosenblum, Mendel, "The Design and Implementation of a Log-structured File System," UC Berkeley, Thesis, 1992, pp. 1-101.

Seltzer, Margo, et al., "An Implementation of a Log Structured File System for UNIX," Winter USENIX, San Diego, CA, Jan. 25-29, 1993, pp. 1-18.

Seltzer, Margo, et al., "File System Performance and Transaction Support," UC Berkeley, Thesis, 1992, pp. 1-131.

Smith, Kent, "Garbage Collection," SandForce, Flash Memory Summit, Santa Clara, CA, Aug. 2011, pp. 1-9.

Twigg, Andy, et al., "Stratified B-trees and Versioned Dictionaries," Proceedings of the 3rd USENIX Conference on Hot Topics in Storage and File Systems, vol. 11, 2011, pp. 1-5.

Wu, Po-Liang, et al., "A File-System-Aware FTL Design for Flash-Memory Storage Systems," Design, Automation & Test in Europe Conference & Exhibition, IEEE, 2009, pp. 1-6.

* cited by examiner

CLUSTERED RAID ASSIMILATION MANAGEMENT

RELATED APPLICATION

The present application is a continuation of U.S. patent application Ser. No. 14/149,488, entitled "Clustered RAID Assimilation Management", filed on Jan. 7, 2014 by Rajesh Sundaram et al., the contents of which are incorporated by reference herein in their entirety.

BACKGROUND

1. Technical Field

The present disclosure relates to clustered storage systems and, more specifically, to storage of metadata relating to configuration of one or more Redundant Array of Independent Disks (RAID) groups (i.e., RAID-related metadata) within a clustered storage system.

2. Background Information

Traditionally, metadata related to one or more Redundant Array of Independent Disks (RAID) groups (i.e., RAID-related metadata) is stored as a RAID label on each storage device, e.g., hard disk drive (HDD) and/or solid state drive (SSD), of a storage system. The RAID label is typically organized as a topology tree structure that identifies, inter alia, a RAID group (i.e., a logical grouping within an aggregate operated cooperatively) to which the storage device belongs, as well as a generation count of the storage device. The RAID-related metadata is also typically replicated across all RAID labels of an aggregate (i.e., a collection of storage devices), such that if a storage device fails, all other storage devices of the RAID group are updated (i.e., modified) to indicate the failed storage device is no longer part of the RAID group. However, RAID label consistency problems may arise in a clustered storage system ("cluster") when two or more storage systems ("nodes") attempt to operate the storage devices, e.g., in high availability or failover redundancy environments.

For example, one problem that may arise from storing RAID labels on storage devices is when a first node of a cluster updates the RAID labels (e.g., increments the generation count) for the storage devices of a RAID group, while a second node of the cluster reads those RAID labels (e.g., during failover or boot-up). Here, the second node may detect that some of the storage devices in the RAID group have a generation count (i.e., incremented) that is different from the generation count (i.e., non-incremented) of the other storage devices. This inconsistency in RAID label "versions" (i.e., differing generation counts) may lead the second node to incorrectly designate the RAID group as degraded. This problem may arise because a notion of ownership of a storage device, e.g., by a node in a cluster, is difficult to consistently maintain across all devices of the aggregate, particularly when transferring ownership among nodes of the cluster in response to a node failure (i.e., another node assuming ownership of the storage device). Typically, only the node of the cluster that owns a storage device is allowed to read (and modify) the RAID label, e.g., to form a RAID group.

Another problem that arises from storing RAID labels on storage devices involves removing a failed storage device from a RAID group or, more generally, from an aggregate. This problem is particularly acute when the storage device goes offline and then subsequently comes back. That is, the storage device may temporarily malfunction and go offline, but subsequently may come back online as part of the aggregate and be reused (i.e., re-designated) as, e.g., a spare. It is problematic to keep track of the status (offline/online) of the storage device on its own RAID label as the storage device cannot be written when it is offline.

Alternatively, keeping track of the storage device's status in the RAID labels of other storage devices, e.g., updating the RAID labels on all of the other storage devices in the aggregate except for the failed device, may lead to the problem described above. The failed storage device may have a generation count (e.g., not-incremented) that is older than the generation count (e.g., incremented) of the updated RAID labels on all the other storage devices. According to a typical algorithm, storage devices having the same generation count are included in the aggregate (i.e., RAID group), whereas a storage device with a different (e.g., older) generation count is excluded from the aggregate. If the storage system crashes when the failed storage device is offline, that storage device would typically be excluded from the aggregate when the system is restored, even as a spare (i.e., when the failed device comes back online) because its generation count is inconsistent with those of the other storage devices.

A solution to the RAID label consistency problems may be to maintain status information of storage devices in an area, e.g., a registry, on the storage devices that is separate from the RAID labels. Yet this solution essentially requires maintenance of multiple configuration sources (i.e., the registry and the RAID labels) which is inefficient. Accordingly, there is a need to obtain RAID-related metadata for an aggregate and to assimilate changes to the aggregate (i.e., RAID group) in a cluster of nodes with failover redundancy, without relying on RAID labels on storage devices of the aggregate.

BRIEF DESCRIPTION OF THE DRAWINGS

The above and further advantages of the embodiments herein may be better understood by referring to the following description in conjunction with the accompanying drawings in which like reference numerals indicate identically or functionally similar elements, of which.

DESCRIPTION OF ILLUSTRATIVE EMBODIMENTS

Figure 1:
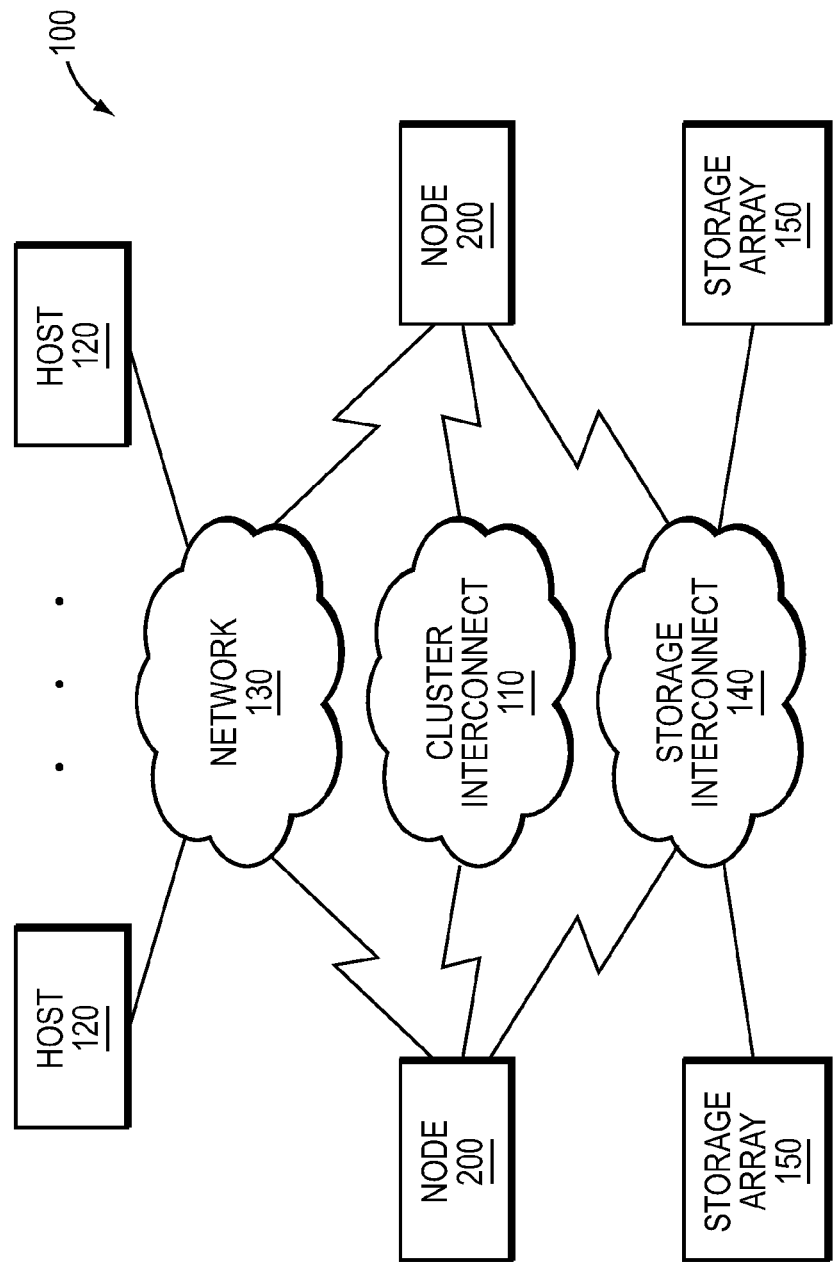
FIG. 1 is a block diagram of a plurality of nodes interconnected as a cluster.

The embodiments described herein are directed to storing RAID-related metadata on a distributed database of a cluster (i.e., a cluster database), which is separate and apart from a storage array of SSDs configured to serve as main storage for nodes of the cluster. The RAID-related metadata may be embodied as RAID labels (or other data structures) having configuration information that identifies one or more RAID groups associated with an extent store and storage devices, e.g., SSDs, within each RAID group. As used herein, an extent store is illustratively a storage container stored on one or more SSDs (i.e., a set of SSDs from the storage array). Each SSD may be part of a RAID configuration topology tree structure that defines an extent store using a multi-level hierarchy (e.g., three levels), wherein the first level of the tree identifies the SSD, the second level identifies the RAID group to which the SSD belongs, and the third level identifies the extent store or storage container to which the RAID group belongs.

In an embodiment, an instance of the cluster database may be maintained (e.g., replicated) on each node of the cluster as a local SSD configured as a service disk. Notably, the cluster database is maintained separate and apart from any main storage (i.e., extent stores stored on the storage arrays) to thereby enable the node to, e.g., boot without any main storage (or before discovering the main storage) and access initial RAID configuration information via the cluster database without dependency on the main storage (i.e., without reading RAID labels on the SSDs of the extent stores owned by the node). That is, the storage array SSDs may be assimilated into one or more RAID group(s) for the extent stores, without the use of RAID labels stored on the SSDs of those RAID group(s). Instead, the RAID configuration information may be obtained from the cluster database. Accordingly, the cluster database is stored completely separate and apart from the main storage (i.e., extent stores) of the nodes, even though it is illustratively distributed among the nodes.

In an embodiment, the cluster database has the properties of consistency, durability and ensuring a quorum of node "members" with respect to, e.g., failover redundancy. As for the latter property, the cluster database may ensure a quorum of active or "alive" (i.e., capable of servicing data) members when updating and servicing a RAID group (i.e., a minimum number of nodes sufficient to reliably serve data). For example, if one node of the cluster fails, a second node may be updated (i.e., informed) as to the failure and be provided access to the failed node's RAID configuration information via the cluster database, e.g., so that the second node may continue to service the RAID group. That is, RAID configuration management is independent of the state of the RAID groups.

In an embodiment, the cluster database eliminates the notion of ownership of storage devices and replaces that with ownership of a storage container or extent store (i.e., aggregate). That is, during a failure, all nodes (of a quorum) may attempt to read the SSDs of a failed node, so as to assimilate those SSDs into, e.g., a RAID group of the extent store to thereby continue servicing the extent store using another node. After assimilation, a determination may be made as to the "new" owner of the extent store (i.e., node determined to service the extent store).

By maintaining RAID-related metadata (i.e., RAID configuration information) in a cluster database that is entirely separate from the SSDs of the storage array, any node of the cluster may access the cluster database to get a list of SSDs in an extent store and perform its own assimilation based on the list of SSDs to determine ownership of the extent store. In an embodiment, all nodes can communicate with the SSDs and those nodes that do not own the extent store may treat the SSDs as read-only (i.e., they do not write to the SSDs). Thus, the embodiments disclosed herein introduce the notion of an owner (node) per extent store (i.e., aggregate), instead of an owner per SSD.

Description

Storage Cluster

FIG. 1 is a block diagram of a plurality of nodes 200 interconnected as a cluster 100 and configured to provide storage service relating to the organization of information on storage devices. The nodes 200 may be interconnected by a cluster interconnect fabric 110 and include functional components that cooperate to provide a distributed storage architecture of the cluster 100, which may be deployed in a storage area network (SAN). As described herein, the components of each node 200 include hardware and software functionality that enable the node to connect to one or more hosts 120 over a computer network 130, as well as to one or more storage arrays 150 of storage devices over a storage interconnect 140, to thereby render the storage service in accordance with the distributed storage architecture.

Each host 120 may be embodied as a general-purpose computer configured to interact with any node 200 in accordance with a client/server model of information delivery. That is, the client (host) may request the services of the node, and the node may return the results of the services requested by the host, by exchanging packets over the network 130. The host may issue packets including file-based access protocols, such as the Network File System (NFS) protocol over the Transmission Control Protocol/Internet Protocol (TCP/IP), when accessing information on the node in the form of storage containers such as files and directories. However, in an embodiment, the host 120 illustratively issues packets including block-based access protocols, such as the Small Computer Systems Interface (SCSI) protocol encapsulated over TCP (iSCSI) and SCSI encapsulated over FC (FCP), when accessing information in the form of storage containers such as logical units (LUNs). Notably, any of the nodes 200 may service a request directed to a storage container stored on the cluster 100.

Figure 2:
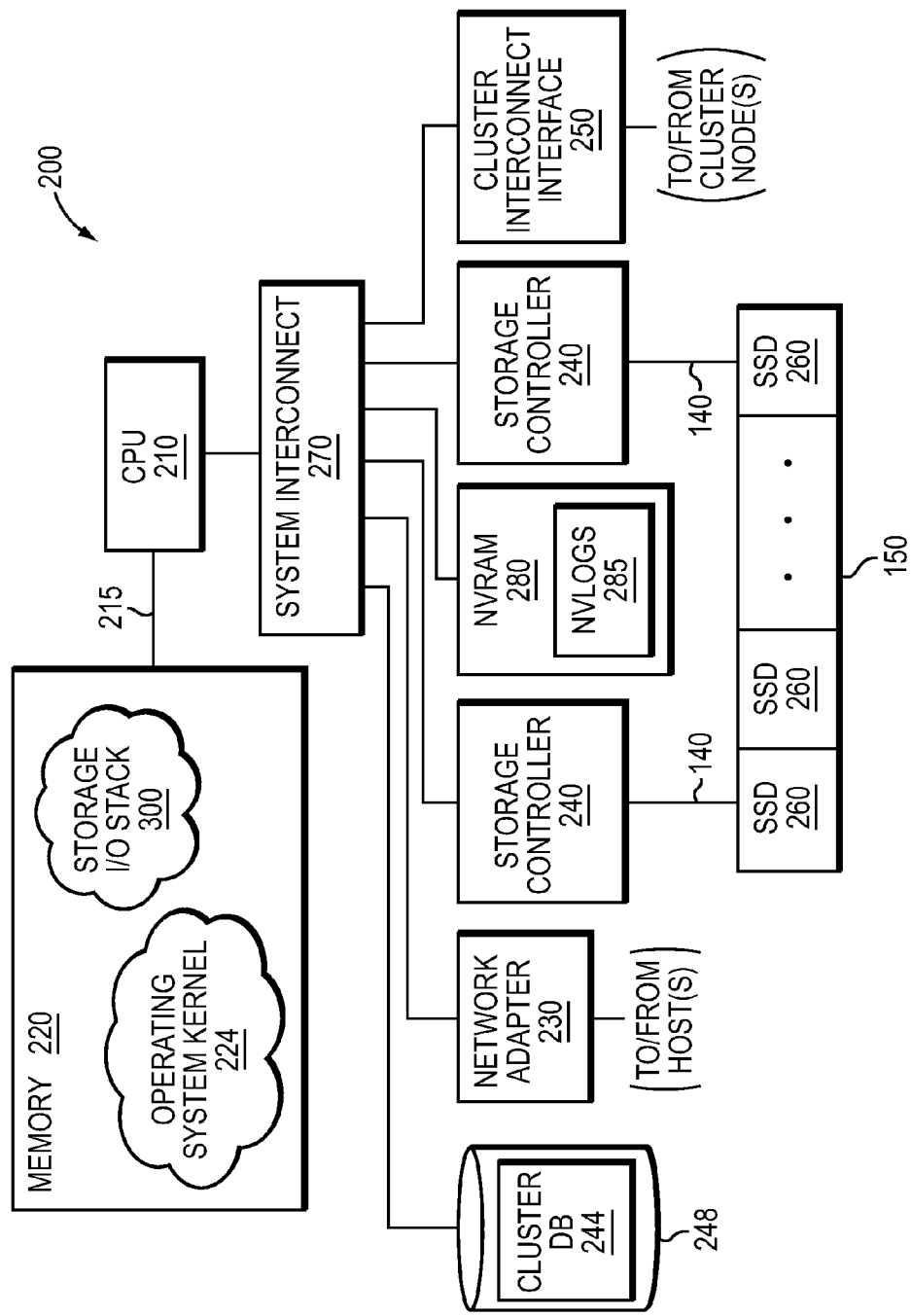
FIG. 2 is a block diagram of a node.

FIG. 2 is a block diagram of a node 200 that is illustratively embodied as a storage system having one or more central processing units (CPUs) 210 coupled to a memory 220 via a memory bus 215. The CPU 210 is also coupled to a network adapter 230, storage controllers 240, a cluster interconnect interface 250, and a non-volatile random access memory (NVRAM 280) via a system interconnect 270. The network adapter 230 may include one or more ports adapted to couple the node 200 to the host(s) 120 over computer network 130, which may include point-to-point links, wide area networks, virtual private networks implemented over a public network (Internet) or a local area network. The network adapter 230 thus includes the mechanical, electrical and signaling circuitry needed to connect the node to the network 130, which illustratively embodies an Ethernet or Fibre Channel (FC) network.

The memory 220 may include memory locations that are addressable by the CPU 210 for storing software programs and data structures associated with the embodiments described herein. The CPU 210 may, in turn, include processing elements and/or logic circuitry configured to execute the software programs, such as a storage input/output (I/O) stack 300, and manipulate the data structures. Illustratively, the storage I/O stack 300 may be implemented as a set of user mode processes that may be decomposed into a plurality of threads. An operating system kernel 224, portions of which are typically resident in memory 220 (in-core) and executed by the processing elements (i.e., CPU 210), functionally organizes the node by, inter alia, invoking operations in support of the storage service implemented by the node and, in particular, the storage I/O stack 300. A suitable operating system kernel 224 may include a general-purpose operating system, such as the UNIX® series or Microsoft Windows® series of operating systems, or an operating system with configurable functionality such as microkernels and embedded kernels. However, in an embodiment described herein, the operating system kernel is illustratively the Linux® operating system. It will be apparent to those skilled in the art that other processing and memory means, including various computer readable media, may be used to store and execute program instructions pertaining to the embodiments herein.

Each storage controller 240 cooperates with the storage I/O stack 300 executing on the node 200 to access information requested by the host 120. The information is preferably stored on storage devices such as solid state drives (SSDs) 260, illustratively embodied as flash storage devices, of storage array 150. In an embodiment, the flash storage devices may be based on NAND flash components, e.g., single-layer-cell (SLC) flash, multi-layer-cell (MLC) flash or triple-layer-cell (TLC) flash, although it will be understood to those skilled in the art that other non-volatile, solid-state electronic devices (e.g., drives based on storage class memory components) may be advantageously used with the embodiments described herein. Accordingly, the storage devices may or may not be block-oriented (i.e., accessed as blocks). The storage controller 240 includes one or more ports having I/O interface circuitry that couples to the SSDs 260 over the storage interconnect 140, illustratively embodied as a serial attached SCSI (SAS) topology. Alternatively, other point-to-point I/O interconnect arrangements may be used, such as a conventional serial ATA (SATA) topology or a PCI topology. The system interconnect 270 may also couple the node 200 to a local service storage device 248, such as an SSD, configured to locally store cluster-related configuration information, e.g., as cluster database (DB) 244, which may be replicated to the other nodes 200 in the cluster 100.

The cluster interconnect interface 250 may include one or more ports adapted to couple the node 200 to the other node(s) of the cluster 100. In an embodiment, Ethernet may be used as the clustering protocol and interconnect fabric media, although it will be apparent to those skilled in the art that other types of protocols and interconnects, such as Infiniband, may be utilized within the embodiments described herein. The NVRAM 280 may include a back-up battery or other built-in last-state retention capability (e.g., non-volatile semiconductor memory such as storage class memory) that is capable of maintaining data in light of a failure to the node and cluster environment. Illustratively, a portion of the NVRAM 280 may be configured as one or more non-volatile logs (NVLogs 285) configured to temporarily record ("log") I/O requests, such as write requests, received from the host 120.

Storage I/O Stack

Figure 3:
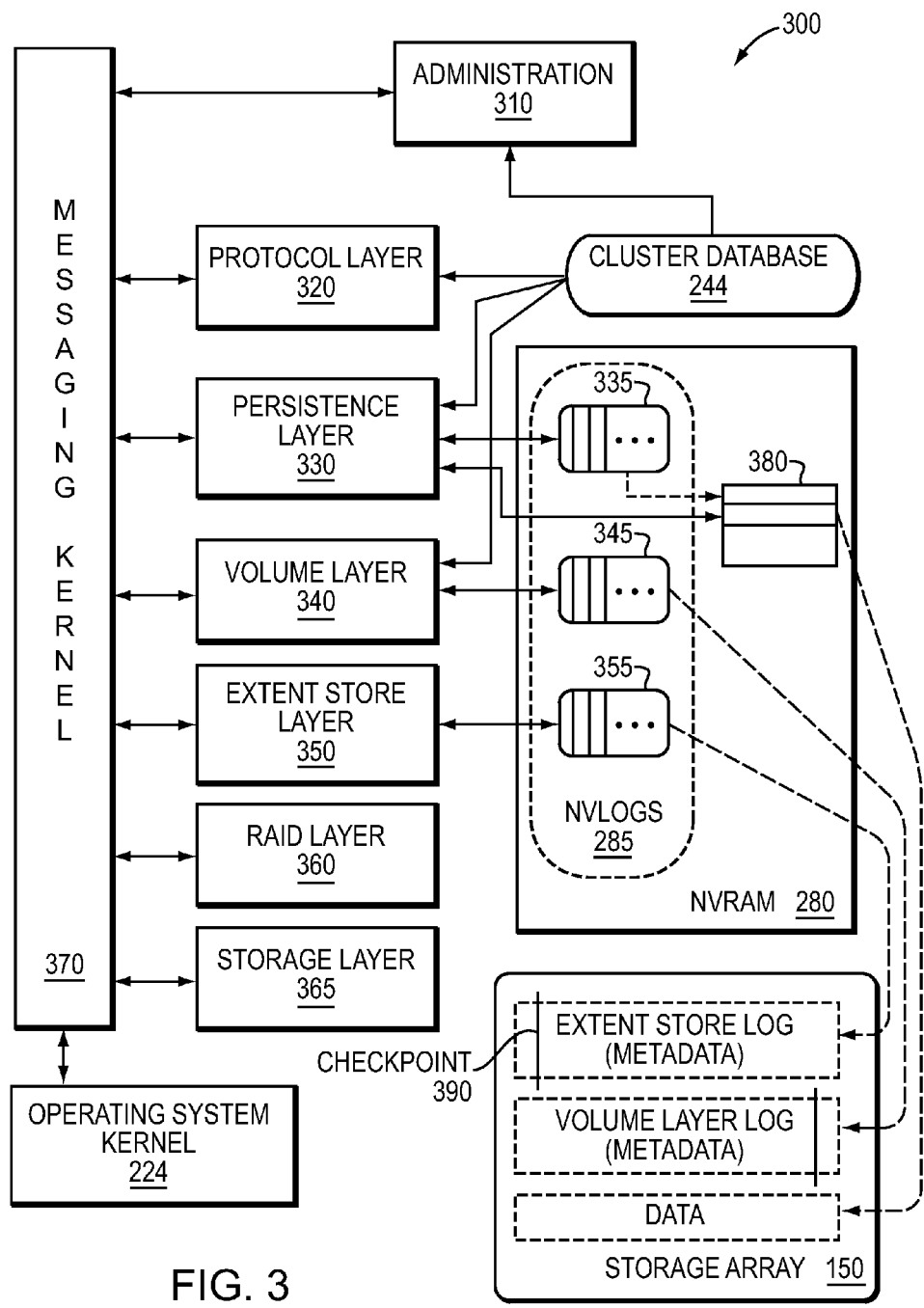
FIG. 3 is a block diagram of a storage input/output (I/O) stack of the node.

FIG. 3 is a block diagram of the storage I/O stack 300 that may be advantageously used with one or more embodiments described herein. The storage I/O stack 300 includes a plurality of software modules or layers that cooperate with other functional components of the nodes 200 to provide the distributed storage architecture of the cluster 100. In an embodiment, the distributed storage architecture presents an abstraction of a single storage container, i.e., all of the storage arrays 150 of the nodes 200 for the entire cluster 100 organized as one large pool of storage. In other words, the architecture consolidates storage, i.e., the SSDs 260 of the arrays 150, throughout the cluster (retrievable via cluster-wide keys) to enable storage of the LUNs. Both storage capacity and performance may then be subsequently scaled by adding nodes 200 to the cluster 100.

Illustratively, the storage I/O stack 300 includes an administration layer 310, a protocol layer 320, a persistence layer 330, a volume layer 340, an extent store layer 350, a Redundant Array of Independent Disks (RAID) layer 360, a storage layer 365 and a NVRAM (storing NVLogs) "layer" interconnected with a messaging kernel 370. The messaging kernel 370 may provide a message-based (or event-based) scheduling model (e.g., asynchronous scheduling) that employs messages as fundamental units of work exchanged (i.e., passed) among the layers. Suitable message-passing mechanisms provided by the messaging kernel to transfer information between the layers of the storage I/O stack 300 may include, e.g., for intra-node communication: i) messages that execute on a pool of threads, ii) messages that execute on a single thread progressing as an operation through the storage I/O stack, iii) messages using an Inter Process Communication (IPC) mechanism, and, e.g., for inter-node communication: messages using a Remote Procedure Call (RPC) mechanism in accordance with a function shipping implementation. Alternatively, the I/O stack may be implemented using a thread-based or stack-based execution model. In one or more embodiments, the messaging kernel 370 allocates processing resources from the operating system kernel 224 to execute the messages. Each storage I/O stack layer may be implemented as one or more instances (i.e., processes) executing one or more threads (e.g., in kernel or user space) that process the messages passed between the layers such that the messages provide synchronization for blocking and non-blocking operation of the layers.

In an embodiment, the protocol layer 320 may communicate with the host 120 over the network 130 by exchanging discrete frames or packets configured as I/O requests according to pre-defined protocols, such as iSCSI and FCP. An I/O request, e.g., a read or write request, may be directed to a LUN and may include I/O parameters such as, inter alia, a LUN identifier (ID), a logical block address (LBA) of the LUN, a length (i.e., amount of data) and, in the case of a write request, write data. The protocol layer 320 receives the I/O request and forwards it to the persistence layer 330, which records the request into a persistent write-back cache 380 illustratively embodied as a log whose contents can be replaced randomly, e.g., under some random access replacement policy rather than only in serial fashion, and returns an acknowledgement to the host 120 via the protocol layer 320. In an embodiment only I/O requests that modify the LUN, e.g., write requests, are logged. Notably, the I/O request may be logged at the node receiving the I/O request, or in an alternative embodiment in accordance with the function shipping implementation, the I/O request may be logged at another node.

Illustratively, dedicated logs may be maintained by the various layers of the storage I/O stack 300. For example, a dedicated log 335 may be maintained by the persistence layer 330 to record the I/O parameters of an I/O request as equivalent internal, i.e., storage I/O stack, parameters, e.g., volume ID, offset, and length. In the case of a write request, the persistence layer 330 may also cooperate with the NVRAM 280 to implement the write-back cache 380 configured to store the write data associated with the write request. In an embodiment, the write-back cache may be structured as a log. Notably, the write data for the write request may be physically stored in the cache 380 such that the log 335 contains the reference to the associated write data. It will be understood to persons skilled in the art that other variations of data structures may be used to store or maintain the write data in NVRAM including data structures with no logs. In an embodiment, a copy of the write-back cache may be also maintained in the memory 220 to facilitate direct memory access to the storage controllers. In other embodiments, caching may be performed at the host 120 or at a receiving node in accordance with a protocol that maintains coherency between the data stored at the cache and the cluster.

In an embodiment, the administration layer 310 may apportion the LUN into multiple volumes, each of which may be partitioned into multiple regions (e.g., allotted as disjoint block address ranges), with each region having one or more segments stored as multiple stripes on the array 150. A plurality of volumes distributed among the nodes 200 may thus service a single LUN, i.e., each volume within the LUN services a different LBA range (i.e., offset range and length, hereinafter offset range) or set of ranges within the LUN. Accordingly, the protocol layer 320 may implement a volume mapping technique to identify a volume to which the I/O request is directed (i.e., the volume servicing the offset range indicated by the parameters of the I/O request). Illustratively, the cluster database 244 may be configured to maintain one or more associations (e.g., key-value pairs) for each of the multiple volumes, e.g., an association between the LUN ID and a volume, as well as an association between the volume and a node ID for a node managing the volume. The administration layer 310 may also cooperate with the database 244 to create (or delete) one or more volumes associated with the LUN (e.g., creating a volume ID/LUN key-value pair in the database 244). Using the LUN ID and LBA (or LBA range), the volume mapping technique may provide a volume ID (e.g., using appropriate associations in the cluster database 244) that identifies the volume and node servicing the volume destined for the request as well as translate the LBA (or LBA range) into an offset and length within the volume. Specifically, the volume ID is used to determine a volume layer instance that manages volume metadata associated with the LBA or LBA range. As noted, the protocol layer 320 may pass the I/O request (i.e., volume ID, offset and length) to the persistence layer 330, which may use the function shipping (e.g., inter-node) implementation to forward the I/O request to the appropriate volume layer instance executing on a node in the cluster based on the volume ID.

In an embodiment, the volume layer 340 may manage the volume metadata by, e.g., maintaining states of host-visible containers, such as ranges of LUNs, and performing data management functions, such as creation of snapshots and clones, for the LUNs in cooperation with the administration layer 310. The volume metadata is illustratively embodied as in-core mappings from LUN addresses (i.e., offsets) to durable extent keys, which are unique cluster-wide IDs associated with SSD storage locations for extents within an extent key space of the cluster-wide storage container. That is, an extent key may be used to retrieve the data of the extent at an SSD storage location associated with the extent key. Alternatively, there may be multiple storage containers in the cluster wherein each container has its own extent key space, e.g., where the administration layer 310 provides distribution of extents among the storage containers. An extent is a variable length block of data that provides a unit of storage on the SSDs and that need not be aligned on any specific boundary, i.e., it may be byte aligned. Accordingly, an extent may be an aggregation of write data from a plurality of write requests to maintain such alignment. Illustratively, the volume layer 340 may record the forwarded request (e.g., information or parameters characterizing the request), as well as changes to the volume metadata, in dedicated log 345 maintained by the volume layer 340. Subsequently, the contents of the volume layer log 345 may be written to the storage array 150 in accordance with a checkpoint (e.g., synchronization) operation that stores in-core metadata on the array 150. That is, the checkpoint operation (checkpoint) ensures that a consistent state of metadata, as processed in-core, is committed to (i.e., stored on) the storage array 150; whereas the retirement of log entries ensures that the entries accumulated in the volume layer log 345 synchronize with the metadata checkpoints committed to the storage array 150 by, e.g., retiring those accumulated log entries prior to the checkpoint. In one or more embodiments, the checkpoint and retirement of log entries may be data driven, periodic or both.

In an embodiment, the extent store layer 350 is responsible for storing extents on the SSDs 260 (i.e., on the storage array 150) and for providing the extent keys to the volume layer 340 (e.g., in response to a forwarded write request). The extent store layer 350 is also responsible for retrieving data (e.g., an existing extent) using an extent key (e.g., in response to a forwarded read request). The extent store layer 350 may be responsible for performing de-duplication and compression on the extents prior to storage. The extent store layer 350 may maintain in-core mappings (e.g., embodied as hash tables) of extent keys to SSD storage locations (e.g., offset on an SSD 260 of array 150). The extent store layer 350 may also maintain a dedicated log 355 of entries that accumulate requested "put" and "delete" operations (i.e., write requests and delete requests for extents issued from other layers to the extent store layer 350), where these operations change the in-core mappings (i.e., hash table entries). Subsequently, the in-core mappings and contents of the extent store layer log 355 may be written to the storage array 150 in accordance with a "fuzzy" checkpoint 390 (i.e., checkpoints with incremental changes recorded in one or more log files) in which selected in-core mappings (less than the total), are committed to the array 150 at various intervals (e.g., driven by an amount of change to the in-core mappings, size thresholds of log 355, or periodically). Notably, the accumulated entries in log 355 may be retired once all in-core mappings have been committed to include the changes recorded in those entries.

In an embodiment, the RAID layer 360 may organize the SSDs 260 within the storage array 150 as one or more RAID groups (e.g., sets of SSDs) that enhance the reliability and integrity of extent storage on the array by writing data "stripes" having redundant information, i.e., appropriate parity information with respect to the striped data, across a given number of SSDs 260 of each RAID group. The RAID layer 360 may also store a number of stripes (e.g., stripes of sufficient depth), e.g., in accordance with a plurality of contiguous range write operations, so as to reduce data relocation (i.e., internal flash block management) that may occur within the SSDs as a result of the operations.

In an embodiment, the storage layer 365 implements storage I/O drivers that may communicate directly with hardware (e.g., the storage controllers and cluster interface) cooperating with the operating system kernel 224, such as a Linux virtual function I/O (VFIO) driver.

Write Path

Figure 4:
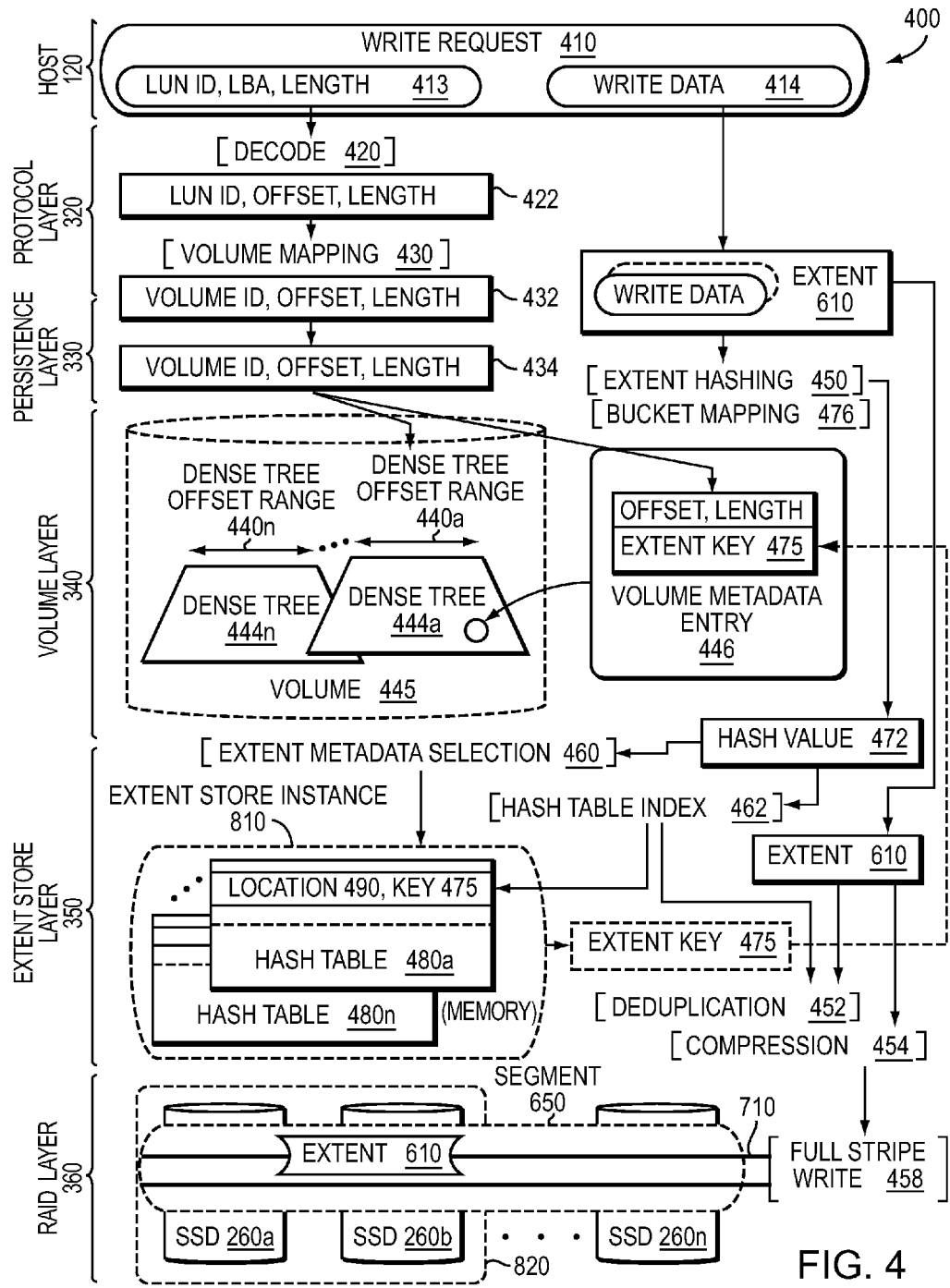
FIG. 4 illustrates a write path of the storage I/O stack.

FIG. 4 illustrates an I/O (e.g., write) path 400 of the storage I/O stack 300 for processing an I/O request, e.g., a SCSI write request 410. The write request 410 may be issued by host 120 and directed to a LUN stored on the storage arrays 150 of the cluster 100. Illustratively, the protocol layer 320 receives and processes the write request by decoding 420 (e.g., parsing and extracting) fields of the request, e.g., LUN ID, LBA and length (shown at 413), as well as write data 414. The protocol layer 320 may use the results 422 from decoding 420 for a volume mapping technique 430 (described above) that translates the LUN ID and LBA range (i.e., equivalent offset and length) of the write request to an appropriate volume layer instance, i.e., volume ID (volume 445), in the cluster 100 that is responsible for managing volume metadata for the LBA range. In an alternative embodiment, the persistence layer 330 may implement the above described volume mapping technique 430. The protocol layer then passes the results 432, e.g., volume ID, offset, length (as well as write data), to the persistence layer 330, which records the request in the persistence layer log 335 and returns an acknowledgement to the host 120 via the protocol layer 320. The persistence layer 330 may aggregate and organize write data 414 from one or more write requests into a new extent 610 and perform a hash computation, i.e., a hash function, on the new extent to generate a hash value 472 in accordance with an extent hashing technique 450.

The persistence layer 330 may then pass the write request with aggregated write data including, e.g., the volume ID, offset and length, as parameters 434 to the appropriate volume layer instance. In an embodiment, message passing of the parameters 434 (received by the persistence layer) may be redirected to another node via the function shipping mechanism, e.g., RPC, for inter-node communication. Alternatively, message passing of the parameters 434 may be via the IPC mechanism, e.g., message threads, for intra-node communication.

In one or more embodiments, a bucket mapping technique 476 is provided that translates the hash value 472 to an instance of an appropriate extent store layer (i.e., extent store instance 810) that is responsible for storing the new extent 610. Note, the bucket mapping technique may be implemented in any layer of the storage I/O stack above the extent store layer. In an embodiment, for example, the bucket mapping technique may be implemented in the persistence layer 330, the volume layer 340, or a layer that manages cluster-wide information, such as a cluster layer (not shown). Accordingly, the persistence layer 330, the volume layer 340, or the cluster layer may contain computer executable instructions executed by the CPU 210 to perform operations that implement the bucket mapping technique 476 described herein. The persistence layer 330 may then pass the hash value 472 and the new extent 610 to the appropriate volume layer instance and onto the appropriate extent store instance via an extent store put operation. The extent hashing technique 450 may embody an approximately uniform hash function to ensure that any random extent to be written may have an approximately equal chance of falling into any extent store instance 810, i.e., hash buckets are distributed across extent store instances of the cluster 100 based on available resources. As a result, the bucket mapping technique 476 provides load-balancing of write operations (and, by symmetry, read operations) across nodes 200 of the cluster, while also leveling flash wear in the SSDs 260 of the cluster.

In response to the put operation, the extent store instance may process the hash value 472 to perform an extent metadata selection technique 460 that (i) selects an appropriate hash table 480 (e.g., hash table 480a) from a set of hash tables (illustratively in-core) within the extent store instance 810, and (ii) extracts a hash table index 462 from the hash value 472 to index into the selected hash table and lookup a table entry having an extent key 475 identifying a storage location 490 on SSD 260 for the extent.

Accordingly, the extent store layer 350 contains computer executable instructions executed by the CPU 210 to perform operations that implement the extent metadata selection technique 460 described herein. If a table entry with a matching extent key is found, then the SSD location 490 mapped from the extent key 475 is used to retrieve an existing extent (not shown) from SSD. The existing extent is then compared with the new extent 610 to determine whether their data is identical. If the data is identical, the new extent 610 is already stored on SSD 260 and a de-duplication opportunity (denoted de-duplication 452) exists such that there is no need to write another copy of the data. Accordingly, a reference count in the table entry for the existing extent is incremented and the extent key 475 of the existing extent is passed to the appropriate volume layer instance for storage within an entry (denoted as volume metadata entry 446) of a dense tree metadata structure 444 (e.g., dense tree 444a), such that the extent key 475 is associated an offset range 440 (e.g., offset range 440a) of the volume 445.

However, if the data of the existing extent is not identical to the data of the new extent 610, a collision occurs and a deterministic algorithm is invoked to sequentially generate as many new candidate extent keys (not shown) mapping to the same bucket as needed to either provide de-duplication 452 or to produce an extent key that is not already stored within the extent store instance. Notably, another hash table (e.g. hash table 480n) may be selected by a new candidate extent key in accordance with the extent metadata selection technique 460. In the event that no de-duplication opportunity exists (i.e., the extent is not already stored) the new extent 610 is compressed in accordance with compression technique 454 and passed to the RAID layer 360, which processes the new extent 610 for storage on SSD 260 within one or more stripes 710 of RAID group 820. The extent store instance may cooperate with the RAID layer 360 to identify a storage segment 650 (i.e., a portion of the storage array 150) and a location on SSD 260 within the segment 650 in which to store the new extent 610. Illustratively, the identified storage segment is a segment with a large contiguous free space having, e.g., location 490 on SSD 260b for storing the extent 610.

In an embodiment, the RAID layer 360 then writes the stripes 710 across the RAID group 820, illustratively as one or more full stripe writes 458. The RAID layer 360 may write a series of stripes 710 of sufficient depth to reduce data relocation that may occur within the flash-based SSDs 260 (i.e., flash block management). The extent store instance then (i) loads the SSD location 490 of the new extent 610 into the selected hash table 480n (i.e., as selected by the new candidate extent key), (ii) passes a new extent key (denoted as extent key 475) to the appropriate volume layer instance for storage within an entry (also denoted as volume metadata entry 446) of a dense tree 444 managed by that volume layer instance, and (iii) records a change to extent metadata of the selected hash table in the extent store layer log 355. Illustratively, the volume layer instance selects dense tree 444a spanning an offset range 440a of the volume 445 that encompasses the offset range of the write request. As noted, the volume 445 (e.g., an offset space of the volume) is partitioned into multiple regions (e.g., allotted as disjoint offset ranges); in an embodiment, each region is represented by a dense tree 444. The volume layer instance then inserts the volume metadata entry 446 into the dense tree 444a and records a change corresponding to the volume metadata entry in the volume layer log 345. Accordingly, the I/O (write) request is sufficiently stored on SSD 260 of the cluster.

Read Path

Figure 5:
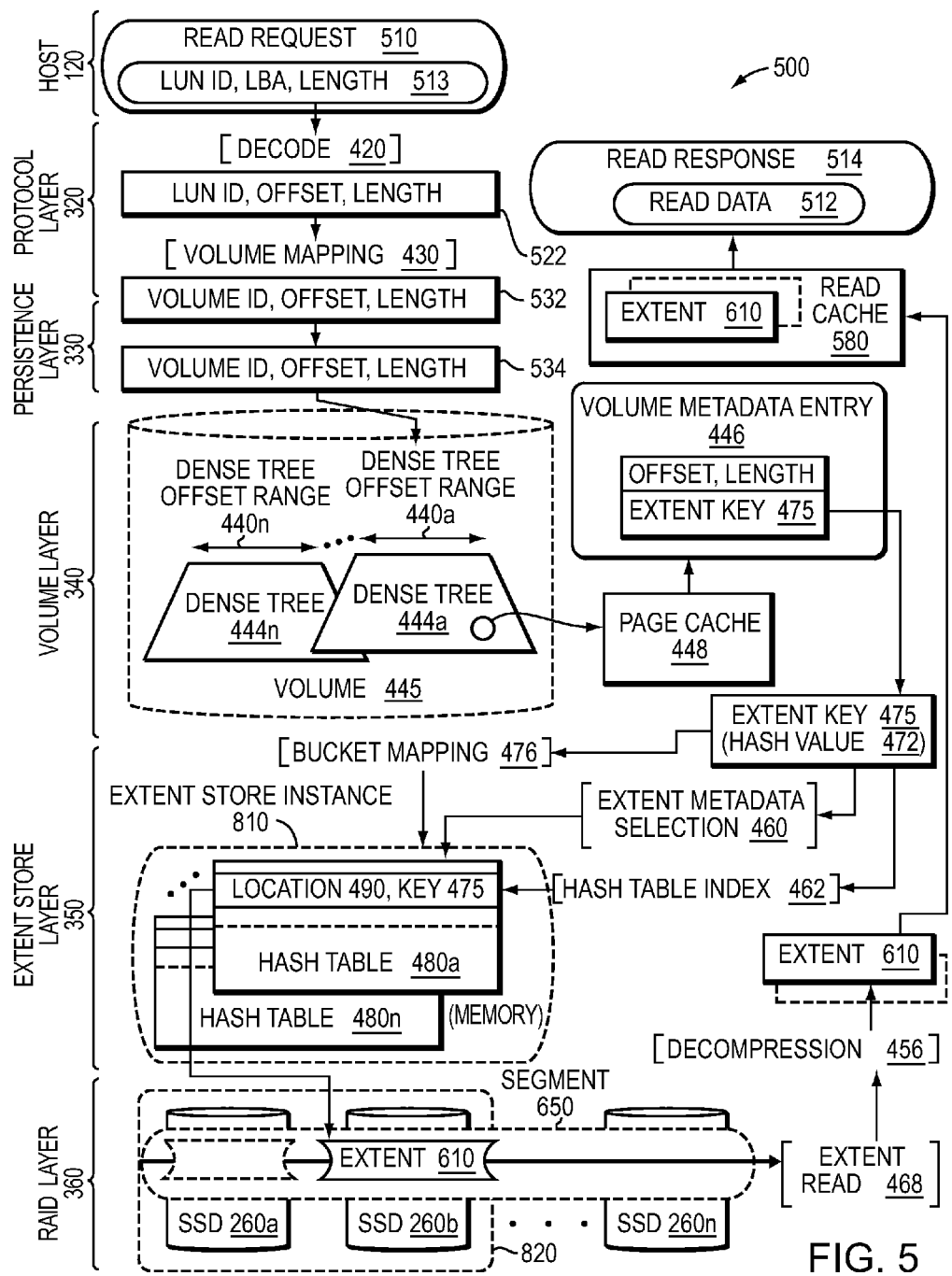
FIG. 5 illustrates a read path of the storage I/O stack.

FIG. 5 illustrates an I/O (e.g., read) path 500 of the storage I/O stack 300 for processing an I/O request, e.g., a SCSI read request 510. The read request 510 may be issued by host 120 and received at the protocol layer 320 of a node 200 in the cluster 100. Illustratively, the protocol layer 320 processes the read request by decoding 420 (e.g., parsing and extracting) fields of the request, e.g., LUN ID, LBA, and length (shown at 513), and uses the decoded results 522, e.g., LUN ID, offset, and length, for the volume mapping technique 430. That is, the protocol layer 320 may implement the volume mapping technique 430 (described above) to translate the LUN ID and LBA range (i.e., equivalent offset and length) of the read request to an appropriate volume layer instance, i.e., volume ID (volume 445), in the cluster 100 that is responsible for managing volume metadata for the LBA (i.e., offset) range. The protocol layer then passes the results 532 to the persistence layer 330, which may search the write cache 380 to determine whether some or all of the read request can be serviced from its cached data. If the entire request cannot be serviced from the cached data, the persistence layer 330 may then pass the remaining portion of the request including, e.g., the volume ID, offset and length, as parameters 534 to the appropriate volume layer instance in accordance with the function shipping mechanism, (e.g., RPC, for inter-node communication) or the IPC mechanism, (e.g., message threads, for intra-node communication).

The volume layer instance may process the read request to access a dense tree metadata structure 444 (e.g., dense tree 444a) associated with a region (e.g., offset range 440a) of a volume 445 that encompasses the requested offset range (specified by parameters 534). The volume layer instance may further process the read request to search for (lookup) one or more volume metadata entries 446 of the dense tree 444a to obtain one or more extent keys 475 associated with one or more extents 610 (or portions of extents) within the requested offset range. In an embodiment, each dense tree 444 may be embodied as multiple levels of a search structure with possibly overlapping offset range entries at each level. The various levels of the dense tree may have volume metadata entries 446 for the same offset, in which case, the higher level has the newer entry and is used to service the read request. A top level of the dense tree 444 is illustratively resident in-core and a page cache 448 may be used to access lower levels of the tree. If the requested range or portion thereof is not present in the top level, a metadata page associated with an index entry at the next lower tree level (not shown) is accessed. The metadata page (i.e., in the page cache 448) at the next level is then searched to find any overlapping entries. This process is then iterated until one or more volume metadata entries 446 of a level are found to ensure that the extent key(s) 475 for the entire requested read range are found. If not metadata entries exist for the entire or portions of the requested range, then the missing portion(s) are zero filled.

Once found, each extent key 475 is processed by the volume layer 340 to, e.g., implement the bucket mapping technique 476 that translates the extent key to an appropriate extent store instance 810 responsible for storing the requested extent 610. Note that, in an embodiment, each extent key 475 may be substantially identical to the hash value 472 associated with the extent 610, i.e., the hash value as calculated during the write request for the extent, such that the bucket mapping 476 and extent metadata selection 460 techniques may be used for both write and read path operations. Note also that the extent key 475 may be derived from the hash value 472. The volume layer 340 may then pass the extent key 475 (i.e., the hash value from a previous write request for the extent) to the appropriate extent store instance 810 (via an extent store get operation), which performs an extent key-to-SSD mapping to determine the location on SSD 260 for the extent.

In response to the get operation, the extent store instance may process the extent key 475 (i.e., hash value 472) to perform the extent metadata selection technique 460 that (i) selects an appropriate hash table 480 (e.g., hash table 480a) from a set of hash tables within the extent store instance 810, and (ii) extracts a hash table index 462 from the extent key 475 (i.e., hash value 472) to index into the selected hash table and lookup a table entry having a matching extent key 475 that identifies a storage location 490 on SSD 260 for the extent 610. That is, the SSD location 490 mapped to the extent key 475 may be used to retrieve the existing extent (denoted as extent 610) from SSD 260 (e.g., SSD 260b). The extent store instance then cooperates with the RAID layer 360 to access the extent on SSD 260b and retrieve the data contents in accordance with the read request. Illustratively, the RAID layer 360 may read the extent in accordance with an extent read operation 468 and pass the extent 610 to the extent store instance. The extent store instance may then decompress the extent 610 in accordance with a decompression technique 456, although it will be understood to those skilled in the art that decompression can be performed at any layer of the storage I/O stack 300. The extent 610 may be stored in a buffer (not shown) in memory 220 and a reference to that buffer may be passed back through the layers of the storage I/O stack. The persistence layer may then load the extent into a read cache 580 (or other staging mechanism) and may extract appropriate read data 512 from the read cache 580 for the LBA range of the read request 510. Thereafter, the protocol layer 320 may create a SCSI read response 514, including the read data 512, and return the read response to the host 120.

Layered File System

The embodiments described herein illustratively employ a layered file system of the storage I/O stack. The layered file system includes a flash-optimized, log-structured layer (i.e., extent store layer) of the file system configured to provide sequential storage of data and metadata (i.e., log-structured layout) on the SSDs 260 of the cluster. The data may be organized as an arbitrary number of variable-length extents of one or more host-visible LUNs served by the nodes. The metadata may include mappings from host-visible logical block address ranges (i.e., offset ranges) of a LUN to extent keys, as well as mappings of the extent keys to SSD storage locations of the extents. Illustratively, the volume layer of the layered file system cooperates with the extent store layer to provide a level of indirection that facilitates efficient log-structured layout of extents on the SSDs by the extent store layer.

In an embodiment, functions of the log-structured layer of the file system, such as write allocation and flash device (i.e., SSD) management, are performed and maintained by the extent store layer 350. Write allocation may include gathering of the variable-length extents to form full stripes that may be written to free segments across SSDs of one or more RAID groups, whereas flash device management may include segment cleaning to create such free segments that indirectly map to the SSDs. Instead of relying on garbage collection in the SSDs, the storage I/O stack may implement segment cleaning (i.e., garbage collection) in the extent store layer to bypass performance impacts of flash translation layer (FTL) functionality (including garbage collection) in the SSD. In other words, the storage I/O stack allows the log-structured layer of the file system to operate as a data layout engine using segment cleaning to effectively replace the FTL functionality of the SSD. The extent store layer may thus process random write requests in accordance with segment cleaning (i.e., garbage collection) to predict flash behavior within its FTL functionality. As a result, a log-structured equivalent source of write amplification for the storage I/O stack may be consolidated and managed at the extent store layer. In addition, the log-structured layer of the file system may be employed, in part, to improve write performance from the flash devices of the storage array.

Segment Cleaning

Figure 6:
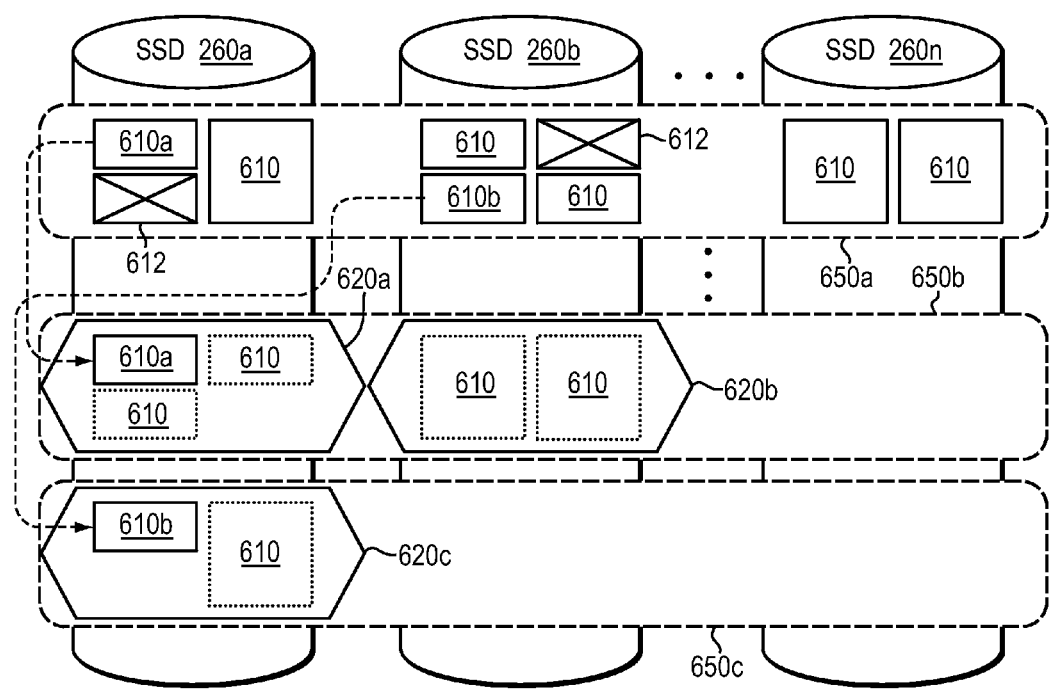
FIG. 6 illustrates segment cleaning by a layered file system of the storage I/O stack.

FIG. 6 illustrates segment cleaning by the layered file system. In an embodiment, the extent store layer 350 of the layered file system may write extents to an empty or free region or "segment." Before rewriting that segment again, the extent store layer 350 may clean the segment in accordance with segment cleaning which, illustratively, may be embodied as a segment cleaning process. The segment cleaning process may read all valid extents 610 from an old segment 650a and write those valid extents (i.e., extents not deleted or overwritten 612) to one or more new segments 650b-c, to thereby free-up (i.e., "clean") the old segment 650a. New extents may then be written sequentially to the old (now clean) segment. The layered file system may maintain a certain amount of reserve space (i.e., free segments) to enable efficient performance of segment cleaning. For example, the layered file system may illustratively maintain a reserve space of free segments equivalent to approximately 7% of storage capacity. The sequential writing of new extents may manifest as full stripe writes 458, such that a single write operation to storage spans all SSDs in a RAID group 820. Write data may be accumulated until a stripe write operation of a minimum depth can be made.

Illustratively, segment cleaning may be performed to free one or more selected segments that indirectly map to SSDs. As used herein, a SSD may be composed of a plurality of segment chunks 620, wherein each chunk is illustratively approximately 1 GB in size. A segment may include a segment chunk 620a-c from each of a plurality of SSDs in a RAID group 820. Thus, for a RAID group having 24 SSDs, wherein 22 SSDs store data (data SSDs) and 2 SSDs store parity (parity SSDs), each segment may include 22 GB of data and 2 GB of parity. The RAID layer may further configure the RAID groups according to one or more RAID implementations, e.g., RAID 1, 4, 5 and/or 6, to thereby provide protection over the SSDs in the event of, e.g., failure to one or more SSDs. Notably, each segment may be associated with a different RAID group and, thus, may have a different RAID configuration, i.e., each RAID group may be configured according to a different RAID implementation. To free-up or clean selected segments, extents of the segments that contain valid data are moved to different clean segments and the selected segments (now clean) are freed for subsequent reuse. Segment cleaning consolidates fragmented free space to improve write efficiency, e.g., to underlying flash blocks by reducing performance impacts of the FTL. Once a segment is cleaned and designated freed, data may be written sequentially to that segment. Accounting structures, e.g., free segment maps or an amount of segment free space, maintained by the extent store layer for write allocation, may be employed by the segment cleaning process. Notably, selection of a clean segment to receive data (i.e., writes) from a segment being cleaned may be based upon the amount of free space remaining in the clean segment and/or the last time the clean segment was used. Note further that different portions of data from the segment being cleaned may be moved to different "target" segments. That is, a plurality of relatively clean segments 650b,c may receive differing portions of data from the segment 650a being cleaned.

Illustratively, segment cleaning may cause some write amplification in the storage array (SSDs). However, the file system may reduce such write amplification by writing extents to the SSDs sequentially as a log device. For example, given SSDs with an erase block size of approximately 2 MBs, by writing at least 2 MB of data (extents) sequentially to a free segment, an entire erase block may be overwritten and fragmentation at the SSD level may be eliminated (i.e., reducing garbage collection in the SSD). Yet, the SSDs typically stripe data across multiple flash components and across multiple channels (i.e., storage controllers 240) in order to realize performance. Thus, a relatively large (e.g., 1 GB) write granularity to a free (i.e., clean) segment may be necessary to avoid write amplification at the SSD level (i.e., to override internal SSD striping).

In an embodiment, because the erase block boundaries in the SSD may be unknown, the write granularity should be large enough so that a sequence of writes for extents over a large contiguous range may overwrite previously written extents on the SSD and effectively override garbage collection in the SSDs. In other words, such garbage collection may be preempted because the new data is written over the same range as previous data such that the new data completely overwrites the previously written data. This approach also avoids consuming the reserve space capacity with the new write data. Accordingly, an advantage of the log-structured feature of the storage I/O stack (i.e., log-structured layer of the file system) is the ability to reduce write amplification of the SSDs with only a minimum amount of reserve space in the SSDs. This log-structured feature effectively "moves" flash device management of reserve space from the SSD to the extent store layer, which uses that reserve space to manage the write amplification. Thus, instead of having two sources of write amplification (i.e., the extent store layer and the SSD FTL, which multiply) there is only one source of write amplification (i.e., the extent store layer).

Write Allocation

In an embodiment, there may be multiple RAID stripes per segment. Each time a segment is allocated, i.e., after cleaning the segment, the chunks of various SSDs within the segment may include a series of RAID stripes, each aligned by extent. The chunks may be at the same or different offsets within the SSDs. The extent store layer may read the chunks sequentially for cleaning purposes and relocate all the valid data to another segment. Thereafter, the chunks 620 of the cleaned segment may be freed and a decision may be rendered as to how to constitute the next segment that uses the chunks. For example, if a SSD is removed from a RAID group, a portion (i.e., a set of chunks 620) of capacity may be omitted from the next segment (i.e., change in RAID stripe configuration) so as to constitute the RAID group from a plurality of chunks 620 that is one chunk narrower, i.e., making the RAID width one less. Thus, by using segment cleaning, a RAID group of the chunks 620 constituting the segments may be effectively created each time a new segment is allocated, i.e., a RAID group is created dynamically from available SSDs when a new segment is allocated. There is generally no requirement to include all of the SSDs 260 in the storage array 150 in the new segment. Alternatively, a chunk 620 from a newly introduced SSD can be added into a RAID group created when a new segment 650 is allocated.

Figure 7A:
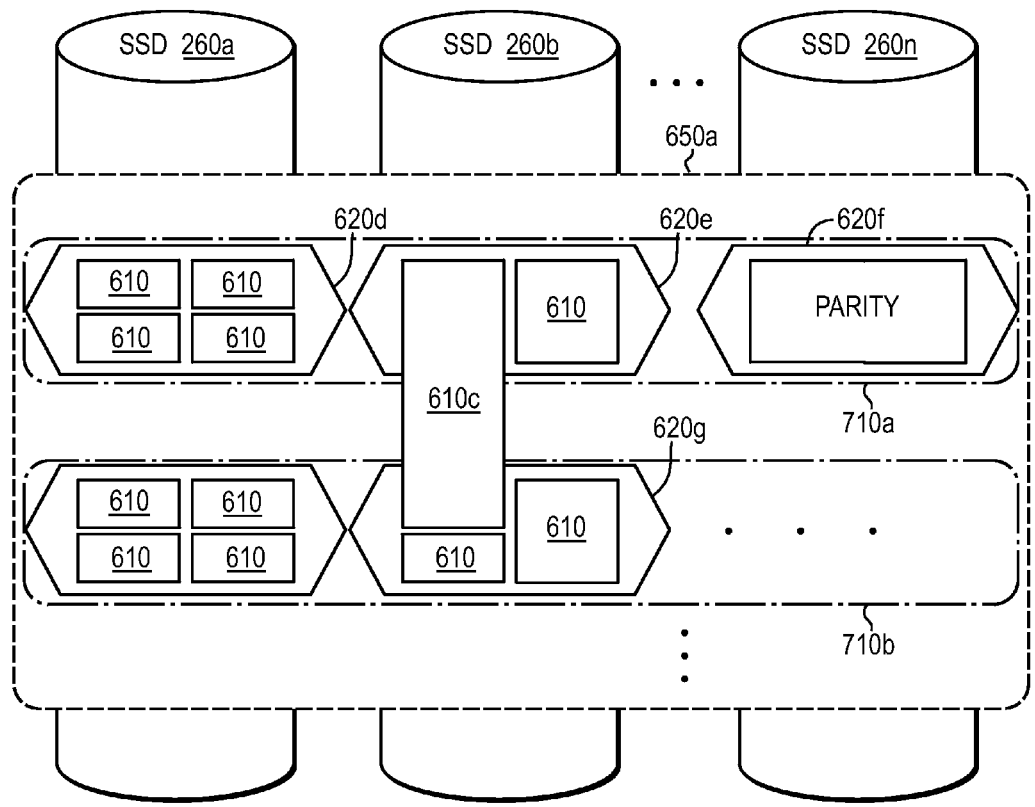
FIG. 7a illustrates a RAID stripe formed by the layered file system.

FIG. 7a illustrates a RAID stripe formed by the layered file system. As noted, write allocation may include gathering of the variable-length extents to form one or more stripes across SSDs of one or more RAID groups. In an embodiment, the RAID layer 360 may manage parity computations and topology information used for placement of the extents 610 on the SSDs 260a-n of the RAID group 820. To that end, the RAID layer may cooperate with the extent store layer to organize the extents as stripes 710 within the RAID group. Illustratively, the extent store layer may gather the extents 610 to form one or more full stripes 710 that may be written to a free segment 650a such that a single stripe write operation 458 may span all SSDs in that RAID group. The extent store layer may also cooperate with the RAID layer to pack each stripe 710 as a full stripe of variable-length extents 610. Once the stripe is complete, the RAID layer may pass the full stripe 710 of extents as a set of chunks 620d-f to the storage layer 365 of the storage I/O stack for storage on the SSDs 260. By writing a full stripe (i.e., data and parity) to the free segment, the layered file system avoids the cost of parity updates and spreads any required read operation load across the SSDs.

In an embodiment, an extent store instance may be viewed as a global pool of extents stored on the storage arrays 150 of the cluster, where each extent may be maintained within a RAID group 820 of an extent stores. Assume one or more variable-length (i.e., small and/or large) extents are written to a segment. The extent store layer may gather the variable-length extents to form one or more stripes across the SSDs of the RAID group. Although each stripe may include multiple extents 610 and an extent 610c could span more than one stripe 710a,b, each extent is entirely stored on one SSD. In an embodiment, a stripe may have a depth of 16 KB and an extent may have a size of 4 KB, but the extent may thereafter be compressed down to 1 or 2 KB or smaller permitting a larger extent to be packed which may exceed the stripe depth (i.e., the chunk 620g depth). Thus, a stripe may constitute only part of the extent, so the depth of the stripe 710 (i.e., the set of chunks 620d-f constituting the stripe) may be independent of the extent(s) written to any one SSD. Since the extent store layer may write the extents as full stripes across one or more free segments of the SSDs, write amplification associated with processing information of the stripes may be reduced.

Segment-Based RAID Configuration

The embodiments described herein are directed to storing RAID-related metadata on a distributed database of the cluster (i.e., the cluster database), which is separate and apart from a storage array of SSDs configured to serve as main storage for the nodes of the cluster. The RAID-related metadata may be embodied as RAID labels (or other data structures) having configuration information that identifies one or more RAID groups associated with an extent store and storage devices, e.g., SSDs, within each RAID group. In turn, each segment of the extent store may be associated with a RAID group (and its associated data structures). Accordingly, each segment may have a different (i.e., its own) RAID configuration as the storage pool changes (i.e., addition and/or removal of SSDs).

Figure 7B:
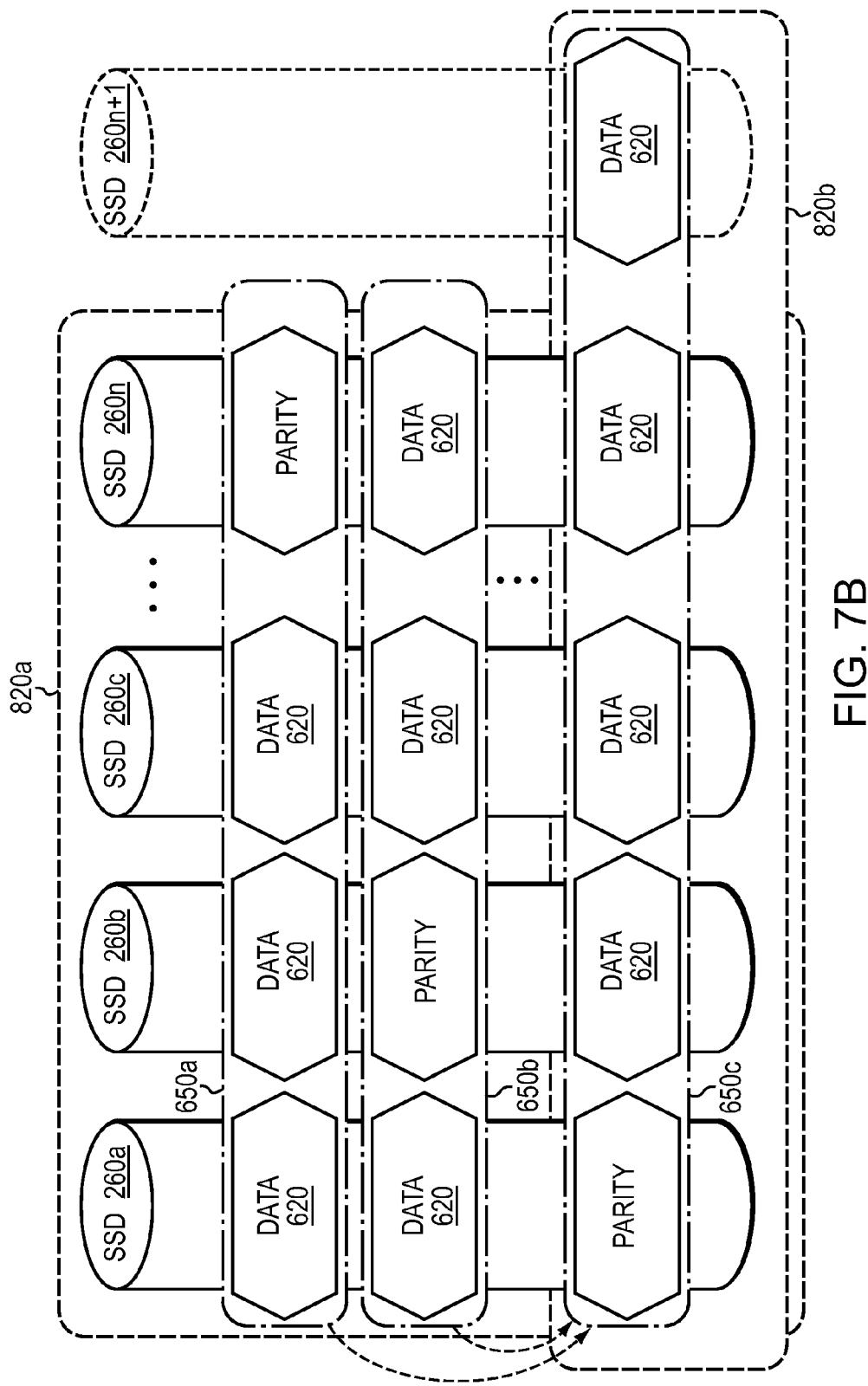
FIG. 7b illustrates changes to a segment-based RAID configuration in accordance with changes to a storage pool of the cluster.

FIG. 7b illustrates changes to a segment-based RAID configuration in accordance with changes to the storage pool of the cluster. Illustratively, a plurality of segments 650a,b is associated with a RAID group 820a having a set of SSDs 260a-n. A new (i.e., additional or replacement) SSD 260n+1 may be added to the storage array such that existing segments 650a,b include SSDs 260a-n, while a new segment 650c includes SSDs 260a-n in addition to SSD 260n+1. As the segments 650a,b are cleaned, data is written (i.e., moved) from those segments to the segment 650c. A new RAID group 820b may be created once new segment 650c is allocated. The layered file system may then write extents to the new segment 650c with the additional capacity available for immediate use either to recover from a degraded level of redundancy or to store additional data.

Figure 8:
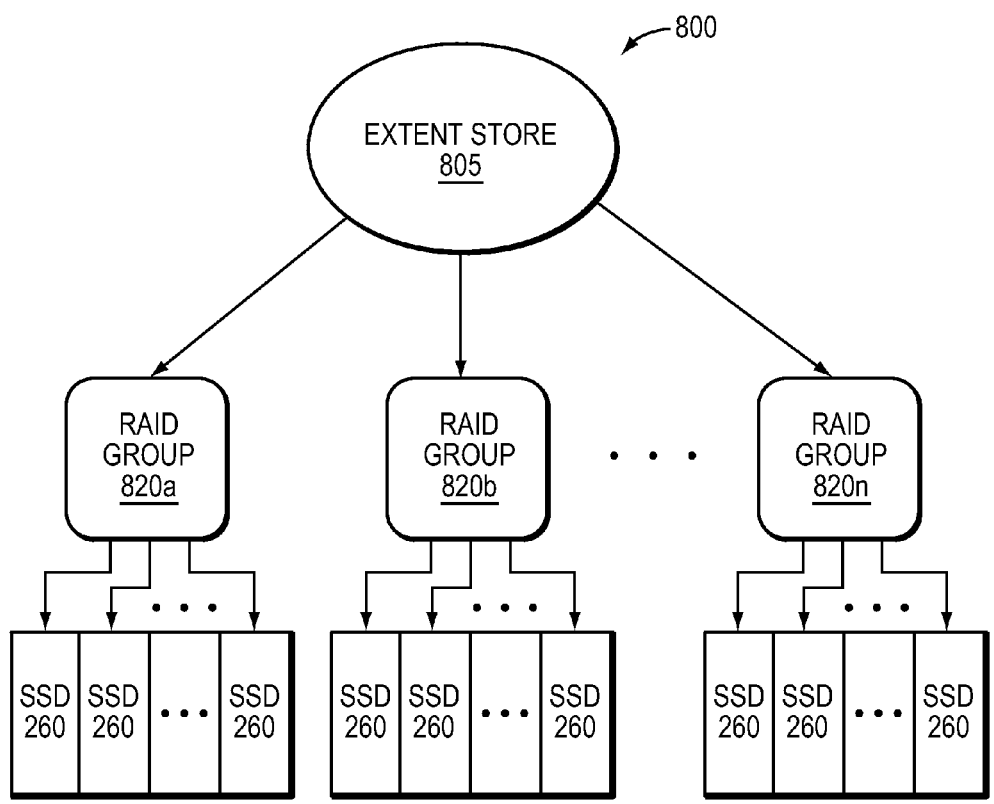
FIG. 8 illustrates a RAID configuration topology tree structure.

Each SSD may be part of a RAID configuration topology tree structure that defines an extent store using a multi-level hierarchy (e.g., three levels), wherein the first level of the tree identifies the SSD, the second level identifies the RAID group to which the SSD belongs, and the third level identifies the extent store or storage container to which the RAID group belongs. FIG. 8 illustrates a RAID configuration topology tree structure. An extent store 805 may include one or more RAID groups 820a-n, each of which may include one or more SSDs 260. Illustratively, each RAID group may be associated with at least one segment of the extent store. That is, a plurality of segments may be associated with the same RAID group, so that RAID groups may vary by segment (or remain the same), i.e., segment-based RAID configuration. Accordingly, SSDs of the storage array are assimilated into RAID groups by segment. As noted, RAID groups are illustratively created when segments are allocated.

Figure 9:
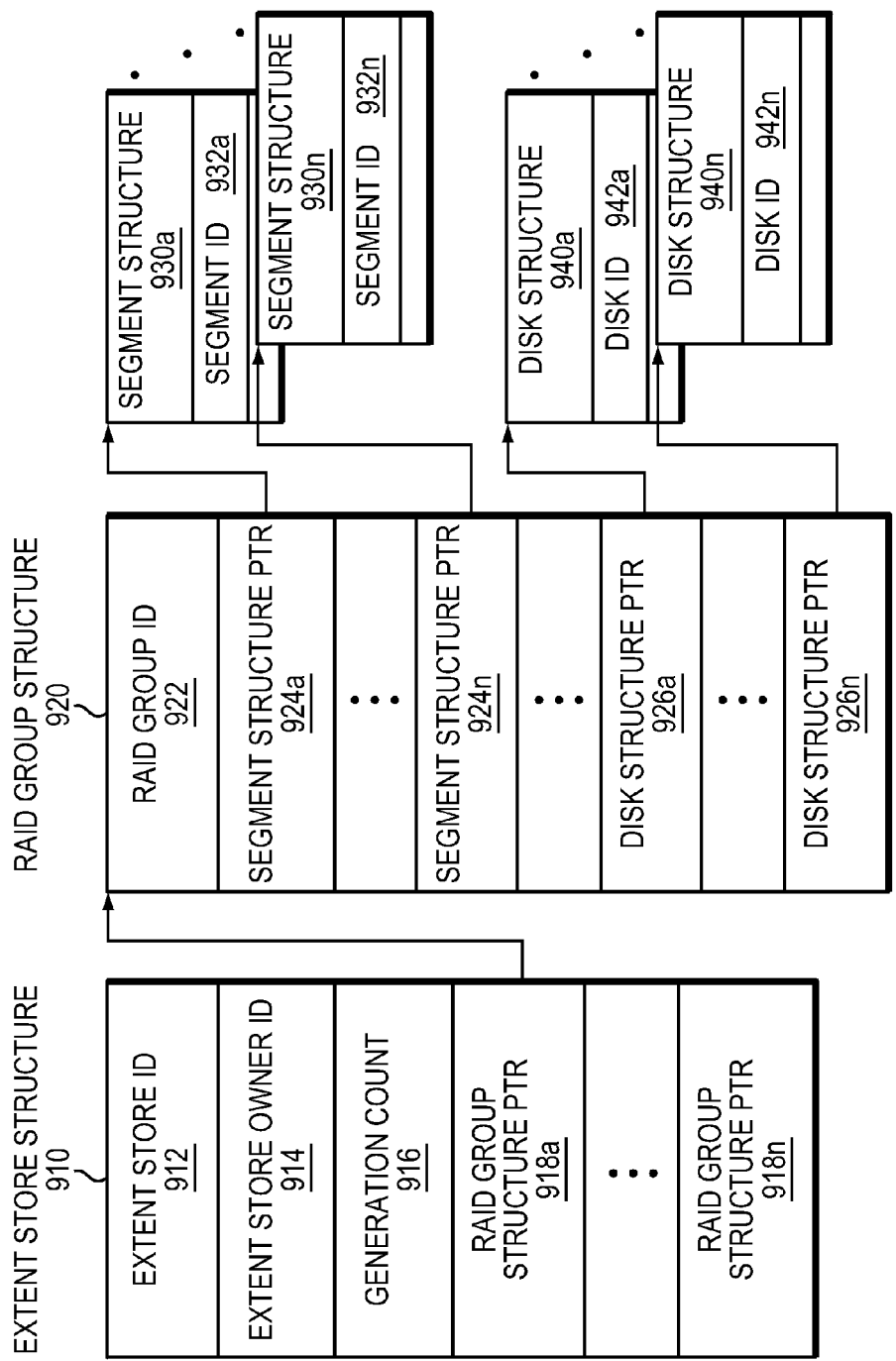
FIG. 9 is a block diagram of data structures representing a RAID configuration.

FIG. 9 is a block diagram of data structures representing a RAID configuration, i.e., the RAID configuration data structures. In one or more embodiments, the RAID configuration data structures include an extent store (data) structure 910, as well as one or more RAID group (data) structures 920, segment (data) structures 930 and disk (data) structures 940, each of which is illustratively stored on the cluster database 244. The extent store data structure 910 illustratively includes an extent store identifier (ID) 912 that identifies an extent store within the cluster 100 and an extent store owner ID 914 that identifies a node 200 which serves (i.e., "owns") the extent store. In an embodiment, a notion of ownership of a storage device by a node is replaced with ownership of a storage container or extent store (i.e., aggregate) by a node; such extent store ownership is identified by the extent store owner ID 914. A generation count 916 illustratively identifies a version of the extent store data structure 910. In an embodiment, the generation count 916 may be incremented when the extent store data structure changes (i.e., is updated). The extent store data structure 910 also includes one or more pointers 918a-n (RAID group structure ptrs), each of which references (points to) a RAID group data structure 920.

The RAID group data structure 920 may include one or more segment structure pointers 924a-n and one or more disk structure pointers 926a-n. Illustratively, each segment structure pointer references a respective segment data structure 930a-n and each disk structure pointer references a respective disk data structure 940a-n. Each of the segment data structures and the disk data structures may include a respective identifier: a segment ID 932a-n that identifies a segment of the extent store and a disk ID 942a-n that identifies an SSD of the storage arrays 150. Notably, SSDs 260 are assimilated into appropriate RAID group data structures when the each node is booted or at run-time when a segment is allocated and the SSDs have changed (i.e., failed, removed or added).

RAID Assimilation Management

In one or more embodiments, an instance of the cluster database 244 may be maintained (e.g., replicated) on each node 200 of the cluster as a local SSD configured as a service disk 248. Notably, the cluster database 244 is maintained separate and apart from any main storage (i.e., extent stores stored on the storage arrays) to thereby enable the node to, e.g., boot without any main storage (or before discovering the main storage) and access initial RAID configuration information via the cluster database without dependency on the main storage (i.e., without reading RAID labels on the SSDs of the extent stores owned by the node). That is, the storage array SSDs may be assimilated into one or more RAID group(s) (i.e., RAID group data structures 920) for the extent store, without the use of RAID labels stored on the SSDs of those RAID group(s). Instead, the RAID configuration information may be obtained from the cluster database. Accordingly, the cluster database is stored completely separate and apart from the main storage (i.e., extent stores) of the nodes, even though it is illustratively distributed among the nodes.

In one or more embodiments, the cluster database has the properties of consistency, durability and ensuring a quorum of node "members" with respect to, e.g., failover redundancy. As for the latter property, the cluster database may ensure a quorum of active or "alive" (i.e., capable of servicing data) members when updating and servicing a RAID group (i.e., a minimum number of nodes sufficient to reliably serve data). For example, if one node of the cluster fails, a second node may be updated (i.e., informed) as to the failure and be provided access to the failed node's RAID configuration information via the cluster database, e.g., so that the second node may continue to service the RAID group. That is, RAID configuration management is independent of the state of the RAID groups, as RAID-related metadata is not generally stored within the RAID groups. Note that the minimum number of nodes to form a quorum may depend on sufficient resources available within the quorum to service all the extent stores. That is, a quorum may be a minimum number of nodes with sufficient resources to execute all extent store instances of the cluster.

Figure 10:
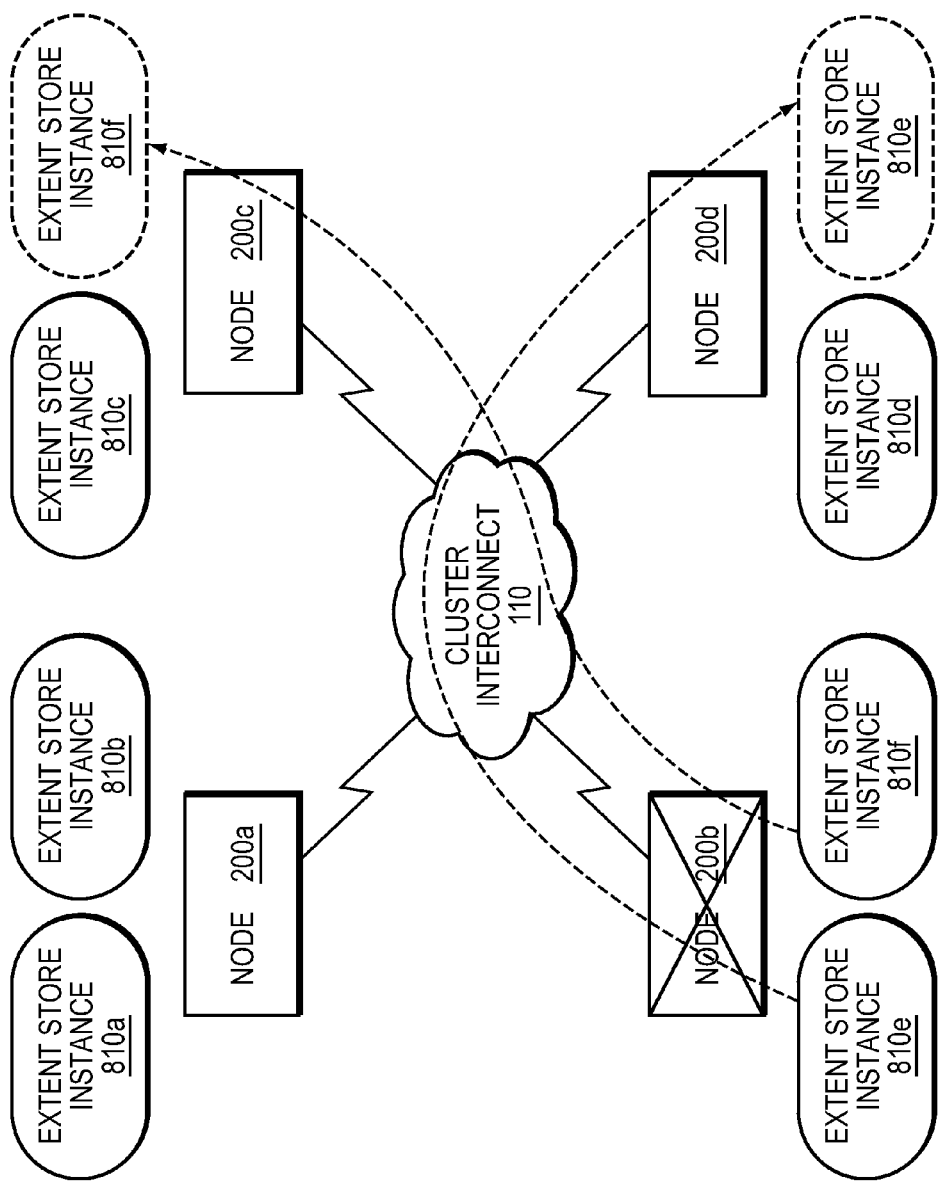
FIG. 10 illustrates a failover of extent store instances.

FIG. 10 illustrates a failover of extent store instances. Illustratively, a four node cluster includes extent stores (as manifested by extent store instances 810a-f) that are distributed among the nodes of the cluster. In response to a failure of node 200b, all remaining nodes 200a,c,d (of a quorum) may attempt to read the SSDs of the failed node (i.e., SSDs associated with the extent stores served by the failed node 200b via extent store instances 810e,f), so as to assimilate (i.e., organize) those SSDs into, e.g., one or more RAID groups to thereby enable continuous servicing of the extent stores. After assimilation, a determination may be rendered, e.g., in accordance with an ownership transfer technique, as to the owner of each extent store (i.e., the node determined to service the extent store using an extent store instance). As a result of the technique, the determination may specify that ownership of extent stores of the failed node 200b is assumed by nodes 200c,d. To that end, extent store instances 810e,f are "transferred" to nodes 200c,d of the cluster. For example, extent store instance 810f may be transferred to node 200c and extent store instance 810e may be transferred to node 200d, such that the nodes 200c,d may service the extent stores via instances 810e,f, respectively. Note that the contents of extent store(s) remain unaffected; it is the servicing of the extent store(s) via the extent store instances that are failed-over.

By maintaining RAID-related metadata (i.e., RAID configuration information) in the cluster database 244 that is entirely separate from the SSDs of the storage array, any node of the cluster may access the cluster database to get a list of SSDs in an extent store and perform its own assimilation based on the list of SSDs to determine ownership of an extent store. In an embodiment, all nodes can communicate with the SSDs and those nodes that do not own the extent store may treat the SSDs as read-only (i.e., they do not write to the SSDs). Thus, the embodiments disclosed herein introduce the notion of an owner (node) per extent store (i.e., aggregate), instead of an owner per SSD.

In an embodiment, the cluster database 244 may be used in a single node implementation, wherein the cluster database has its own storage separate and apart from the main storage (i.e., extent stores) of the node. Note that the nodes 200 of the cluster are consumers of the cluster database 244. In addition, a messaging protocol (such as, e.g., an atomic broadcast) may be provided to maintain the consistency of the cluster database as distributed among the nodes of the cluster. That is, whenever there is a status change to a SSD (e.g., it fails) the cluster database may be updated via the atomic broadcast to all of the nodes to ensure the quorum is consistent. Notably, this update may be "lazy," i.e., it need not be synchronous across the nodes.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software encoded on a tangible (non-transitory) computer-readable medium (e.g., disks and/or CDs) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
receiving a write request directed towards a logical unit (LUN), the write request having data and processed at a first node of a cluster, the first node connected to a storage array of solid state drives (SSDs) forming a storage pool;
organizing a set of SSDs into a first redundancy group having a first redundancy configuration;
organizing an extent store from the first redundancy group;
storing the first redundancy configuration apart from the storage pool, wherein the first redundancy configuration includes a first association between the extent store and the first redundancy group, wherein the first redundancy configuration includes a second association between the extent store and the first node; and
storing the data in a segment of the extent store, wherein the segment has a log-structured layout, wherein the first redundancy configuration includes a third association between the segment and the first redundancy group.

2. The method of claim 1 wherein the first association includes a redundancy group identifier for the first redundancy group, wherein the second association includes a node identifier for the first node, and wherein the third association includes a segment identifier for the segment.

3. The method of claim 1 comprising:
accessing the redundancy configuration of the first redundancy group to assimilate one or more SSDs of the storage pool into the first redundancy group.

4. The method of claim 3 wherein accessing the redundancy configuration of the first redundancy group occurs while booting the first node.

5. The method of claim 3 wherein accessing the redundancy configuration of the first redundancy group occurs by a second node of the cluster in response to a failure of the first node.

6. The method of claim 5 wherein an ownership of the extent store transfers from the first node to the second node.

7. The method of claim 5 further comprising:
updating the second association of the first redundancy configuration to associate the extent store to the second node.

8. The method of claim 1 wherein the first redundancy configuration is stored on a separate storage device for each node of the cluster.

9. The method of claim 8 wherein the first redundancy configuration is replicated across the nodes of the cluster synchronously.

10. A method comprising:
receiving a write request directed towards a logical unit (LUN), the write request having data and processed at a node of a cluster, the node connected to a storage array of solid state drives (SSDs) forming a storage pool;

organizing a set of SSDs into a first redundancy group having a first redundancy configuration;

organizing an extent store from the first redundancy group;

storing the first redundancy configuration apart from the storage pool, wherein the first redundancy configuration includes a first association between the extent store and the first redundancy group, wherein the first redundancy configuration includes a second association between the extent store and the node;

storing the data in a first segment of the extent store, wherein the first segment has a log-structured layout, wherein the first redundancy configuration includes a third association between the first segment and the first redundancy group;

in response to a failed SSD in the first redundancy group, allocating a second segment associated with a second redundancy group, wherein the second segment has a log-structured layout, wherein the second redundancy group is organized from the set of SSDs excluding the failed SSD; and storing the second redundancy configuration apart from the storage pool, wherein the second redundancy configuration includes a fourth association between the extent store and the second redundancy group, wherein the second redundancy configuration includes a fifth association between the extent store and the node, wherein the second redundancy configuration includes a sixth association between the second segment and the second redundancy group.

11. A system comprising:
a first node of a cluster, the first node having a memory connected to a processor via a bus;
a storage array coupled to the first node and having one or more solid state drives (SSDs) forming a storage pool;
a storage I/O stack executing on the processor of the first node, the storage I/O stack when executed operable to:
receive a write request having data directed towards a logical unit (LUN);
organize a set of SSDs into a first redundancy group having a first redundancy configuration;
organize an extent store from the first redundancy group;
store the first redundancy configuration apart from the storage pool, wherein the first redundancy configuration includes a first association between the extent store and the first redundancy group, wherein the first redundancy configuration includes a second association between the extent store and the first node; and
store the data in a segment of the extent store, wherein the segment has a log-structured layout, wherein the first redundancy configuration includes a third association between the segment and the first redundancy group.

12. The system of claim 11 wherein the first association includes a redundancy group identifier for the first redundancy group, wherein the second association includes a node identifier for the first node, and wherein the third association includes a segment identifier for the segment.

13. The system of claim 11 wherein the storage I/O stack is further configured to access the redundancy configuration of the first redundancy group to assimilate one or more SSDs of the storage pool into the first redundancy group.

14. The system of claim 13 wherein access of the redundancy configuration of the first redundancy group occurs while booting the first node.

15. The system of claim 13 wherein access of the redundancy configuration of the first redundancy group occurs by a second node of the cluster in response to a failure of the first node.

16. The system of claim 15 wherein an ownership of the extent store transfers from the first node to the second node.

17. The system of claim 15 wherein the storage I/O stack is further configured to update the second association of the first redundancy configuration to associate the extent store to the second node.

18. The system of claim 11 wherein the first redundancy configuration is stored on a separate storage device for each node of the cluster.

19. The system claim 18 wherein the first redundancy configuration is replicated across a quorum of nodes of the cluster synchronously.

20. The system of claim 19 wherein the first redundancy configuration is updated via an atomic broadcast to the quorum of nodes.

* * * * *